(12) United States Patent
Chambers

(10) Patent No.: US 12,311,580 B2
(45) Date of Patent: May 27, 2025

(54) COMPOSITE LUMBER COMPRISING CURABLE POLYMER AND RENEWABLE NATURAL MATERIALS AND METHOD FOR MAKING THE SAME

(71) Applicant: Chauncey E. Chambers, Chesterland, OH (US)

(72) Inventor: Chauncey E. Chambers, Chesterland, OH (US)

( * ) Notice: Subject to any disclaimer, the term of this patent is extended or adjusted under 35 U.S.C. 154(b) by 0 days.

(21) Appl. No.: 18/755,047

(22) Filed: Jun. 26, 2024

(65) Prior Publication Data

US 2025/0026043 A1   Jan. 23, 2025

Related U.S. Application Data

(60) Provisional application No. 63/527,193, filed on Jul. 17, 2023.

(51) Int. Cl.

| | | |
|---|---|---|
| *B29B 7/80* | (2006.01) | |
| *B29B 7/00* | (2006.01) | |
| *B29C 39/00* | (2006.01) | |
| *B29C 39/38* | (2006.01) | |
| *B29C 48/00* | (2019.01) | |
| *B29K 63/00* | (2006.01) | |
| *B29K 75/00* | (2006.01) | |

(Continued)

(52) U.S. Cl.
CPC ............... *B29B 7/80* (2013.01); *B29B 7/005* (2013.01); *B29C 39/003* (2013.01); *B29C 39/38* (2013.01); *B29C 48/022* (2019.02); *B29K 2063/00* (2013.01); *B29K 2075/00* (2013.01); *B29K 2105/16* (2013.01); *B29K 2511/00* (2013.01); *B29L 2031/10* (2013.01)

(58) Field of Classification Search
CPC ......... B29B 7/005; B29B 7/80; B29C 48/022; B29C 39/003; B29C 39/38; B29K 2063/00; B29K 2075/00; B29K 2105/16; B29K 2511/00; B29L 2031/10
See application file for complete search history.

(56) References Cited

U.S. PATENT DOCUMENTS

| | | | | |
|---|---|---|---|---|
| 2,587,930 A | * | 3/1952 | Uschmann | ............... B29C 48/86 425/162 |
| 5,855,832 A | * | 1/1999 | Clausi | ....................... B27N 3/02 264/109 |

(Continued)

FOREIGN PATENT DOCUMENTS

| | | |
|---|---|---|
| CN | 103146211 B | 6/2015 |
| GB | 1387454 | 3/1975 |
| WO | WO-2022214646 A1 * 10/2022 ............. B27N 1/003 |

*Primary Examiner* — Galen H Hauth
*Assistant Examiner* — Ariella Machness
(74) *Attorney, Agent, or Firm* — Hudak, Shunk & Farine Co. LPA

(57) ABSTRACT

A composite lumber comprising a curable polymer and renewable natural materials, from a plant-based and/or tree-based source, as well as a method for manufacturing the same. In a preferred embodiment, the composite lumber is cast to a specific size and shape, for example as commonly utilized in commercial or home building industries. The composite lumber includes different sizes of natural materials which impart desirable properties thereto. In one embodiment, the method of the invention incorporates the different-sized natural materials in a sequential order based on size, starting from the smallest size.

15 Claims, 2 Drawing Sheets

(51) Int. Cl.
*B29K 105/16* (2006.01)
*B29K 511/00* (2006.01)
*B29L 31/10* (2006.01)

(56) References Cited

U.S. PATENT DOCUMENTS

| | | |
|---|---|---|
| 5,866,264 A | 2/1999 | Zehner et al. |
| 7,993,552 B2 | 8/2011 | Brown |
| 7,993,553 B2 | 8/2011 | Brown |
| 8,387,695 B1 * | 3/2013 | Shanbhag ............... C04B 26/10 |
| | | 166/295 |
| 8,907,037 B2 | 12/2014 | Chorvath et al. |
| 9,752,015 B2 * | 9/2017 | Kumar .................... C08K 3/00 |
| 9,920,202 B2 | 3/2018 | Mente |
| 10,704,269 B2 | 7/2020 | Whispell et al. |
| 11,007,670 B2 | 5/2021 | Lewis et al. |

* cited by examiner

COMPOSITE LUMBER COMPRISING CURABLE POLYMER AND RENEWABLE NATURAL MATERIALS AND METHOD FOR MAKING THE SAME

FIELD OF THE INVENTION

This invention relates to composite lumber comprising a curable polymer and renewable natural materials, from a plant-based and/or tree-based source, as well as a method for manufacturing the same. In a preferred embodiment, the composite lumber is cast to a specific size and shape, for example as commonly utilized in commercial or home building industries. The composite lumber includes different sizes of natural materials which impart desirable properties thereto. In one embodiment, the method of the invention incorporates the different-sized natural materials in a sequential order based on size, starting from the smallest size.

BACKGROUND OF THE INVENTION

Mature trees have been harvested for decades to produce lumber for construction. Sawing to particular sizes and machining to finished forms results in a substantial waste of time and materials. Therefore, a need exists for composite lumber and a method for manufacturing composite lumber from renewable natural materials produced in shapes and sizes of common building materials.

Even in view of the prior art, methods for manufacturing composite lumber including renewable natural materials are needed.

GB 1387454 relates to a process for the production of lignocellulose-containing materials.

U.S. Pat. No. 5,866,264 relates to a process in which an article of manufacture may be produced which includes a renewable surface on a synthetic wood composite substrate.

U.S. Pat. Nos. 7,993,552 & 7,993,553 relate to composite compositions having a matrix of polymer networks and dispersed phases of particulate or fibrous materials. The matrix is filled with a particulate phase, which can be selected from one or more of a variety of components, such as fly ash particles, axially oriented fibers, fabrics, chopped random fibers, mineral fibers, ground waste glass, granite dust, or other solid waste materials. A system for providing shape and/or surface features to a moldable material includes, in an exemplary embodiment, at least two first opposed flat endless belts spaced apart a first distance, with each having an inner surface and an outer surface.

U.S. Pat. No. 8,907,037 relates to a lignocellulosic products comprising a plurality of lignocellulosic pieces and a binding agent, lignocellulosic composite articles formed therefrom and to methods of forming lignocellulosic products and/or composite articles.

Lignocellulosic composite articles, such as oriented strand board (OSB), oriented strand lumber (OSL), particleboard (PB), scrimber, agrifiber board, chipboard, flakeboard, and fiberboard, e.g., medium density fiberboard (MDF), are generally produced by blending or spraying lignocellulosic pieces with a binding agent, while the lignocellulosic pieces are mixed in a suitable mixer or similar apparatus. After initial mixing a binding agent/lignocellulosic pieces mixture is prepared wherein the lignocellulosic pieces are typically coated with the binding agent. This resulting mixture is subsequently formed into a product which might be suitably described as loosely bonded platter. This loosely bonded board is then compressed, at temperatures of from about 100° C. to about 250° C. optionally in the presence of steam (which may be introduced as part of the process or produced from moisture extracted from the lignocellulosic pieces in the loosely bonded platter). The compression step is utilised to set the binding agent and bond the lignocellulosic pieces together in a densified form, i.e., in the form of a board or panel or the like.

The lignocellulosic pieces used in the above process may be in the form of chips, shavings, strands, scrim, wafers, fibres, sawdust, bagasse, straw and wood wool. The lignocellulosic composite articles produced by the process are known in the art under the general term of "engineered wood" in the cases when the lignocellulosic pieces contained therein are relatively larger in size, e.g., from 2 to 20 cm. Engineered woods are manufactured under a variety of names including, for the sake of example, wafer board, laminated strand lumber, OSB, OSL, scrimber, parallel strand lumber, and laminated veneer lumber.

CN Patent 103146211 relates to a preparation method of an enhanced organosilicone segmented polyurethane elastomer terminated by wood flour and siloxane. The method comprises the following steps of: carrying out kneading, pouring in a vacuum pouring machine and curing by using an organosilicone segmented polyurethane prepolymer terminated by siloxane as an adhesive material, using wood flour, silica and mica powder as fillers, using SR629 levelling modifier and KH-590 or 570 surface modifier, using stannous octoate or dibutyltin dilaurate as a curing catalyst, using superfine fibres as reinforcing materials, and using vinyl compound as a viscosity regulator so as to obtain the enhanced flour-siloxane organosilicone segmented polyurethane elastomer. The elastomer is reportedly high in strength and elasticity, strong in impact-resistant capacity, excellent in high-temperature and low-temperature stability and low in the coefficient of thermal expansion, and has the advantages of good stain-resistant performance, wear resistance and ageing resistance.

U.S. Pat. No. 9,752,015 relates to polymeric composites and methods for preparing the composites are described herein. The polymeric composites can comprise a polymer, an inorganic filler, and a plurality of short length fibers. The polymer in the composites can include homopolymers and copolymers and can also include plastics, resins, elastomers, thermoplastics, thermosets, and hot melts. The inorganic filler can be fly ash. The short length fibers can have an average length of 650 μm or less. Methods for making the polymeric composites are also described.

U.S. Pat. No. 9,920,202 relates to a lignocellulosic composite article that includes a plurality of lignocellulosic pieces and an adhesive system disposed on the plurality of lignocellulosic pieces for bonding the plurality of lignocellulosic pieces. The adhesive system includes a binder component and a compatibilizer component. An example of a suitable binder component is an isocyanate component, e.g. a diphenylmethane diisocyanate (MDI), a polymeric diphenylmethane diisocyanate (pMDI), and combinations thereof. The compatibilizer component includes a trialkyl phosphate. The compatibilizer component is utilized in an amount of at least about 0.5 parts by weight based on 100 parts by weight of the binder component. The compatibilizer component is useful for reducing the amount of press time required during manufacture of the composite article. The adhesive system can include additional components, such as an isocyanate-reactive component. The composite article may be various lignocellulosic composites, such as oriented strand board (OSB), particleboard (PB), fiberboard (e.g. medium density fiberboard; MDF), etc.

U.S. Pat. No. 10,704,269 relates to surface coverings, such as floor coverings, with an interlocking design are described. Methods of making the surface coverings are further described. A plank including a resilient composite sheet having four sides, an upper surface, a lower surface, and an overall thickness, and said composite sheet comprising at least one base layer, wherein said at least one base layer comprising at least one polymeric material and at least one filler, wherein opposite sides of the composite sheet comprise a first tongue on a first side and a first groove on the opposite second side, wherein the first tongue and first groove have complementary shape to each other to be interlockingly engageable with a corresponding groove or tongue on an adjacent floor plank.

U.S. Pat. No. 11,007,670 relates to a process of producing a manufactured wood product comprises providing a plurality of wood pieces having substantially an equilibrium moisture content; contacting the plurality of wood pieces with one or more additives under conditions for the additive(s) to soak into the wood pieces; applying a thermoplastic adhesive comprising a thermoplastic resin and a crosslinking agent to the wood pieces to form adhesive coated wood pieces; optionally heating the adhesive coated wood pieces to form heated adhesive coated wood pieces; assembling the adhesive coated wood pieces in a desirable configuration to form assembled adhesive coated wood pieces; compressing the assembled adhesive coated wood pieces in a press at a pressure and for a time sufficient to compact and compress the assembled wood pieces to force trapped air out of and mechanically deform the assembled adhesive coated wood pieces so that adjacent wood pieces conform to the shape of one another; crosslinking the thermoplastic adhesive to at least a critical crosslinking amount during the compression step to form an at least partially cured manufactured wood product, wherein the critical crosslinking amount is sufficient such that the at least partially cured manufactured wood product substantially maintains its compressed form and prevents the wood pieces expanding and returning to their initial state upon release of pressure in the compression step; removing the at least partially cured manufactured wood product from the press; and optionally, further curing the partially cured manufactured wood product to provide the manufactured wood product having substantially an equilibrium moisture content.

SUMMARY OF THE INVENTION

In view of the above, one object of the invention is to provide composite lumber formed from a curable polymer, curing agent and a renewable natural material. The composite lumber can be cast to exact sizes and shapes of commonly utilized lumber and finishing materials, such as components for door frames and casings.

A further object of the present invention is to provide a method for blending preheated curable polymer, curing agent and a renewable natural material and casting the composite to an exact size and shape of home building lumber.

An additional object of the present invention is to provide a method for making plastic bonded wood-like components cast or extruded to home building lumber size of strong physical properties, safety features, shapes and sizes.

Another object of the present invention is to provide a method for blending a preheated polymer comprising a polyurethane or epoxy binder in a batch mixing tub.

Still further object of the present invention is to provide a method for blending preheated renewable natural materials, which serve as fillers and spacers, in a composite composition.

A further object of the present invention is to provide a method including the step of conveying heated mix tub batch including a polymer, curing agent and natural materials to a mold packing area or the extrusion unit.

Yet another object of the present invention is to provide a cure oven for curing the composite composition at a predetermined temperature and a suitable length of time.

In a preferred embodiment, all methods of manufacture are performed in a temperature and humidity controlled and enclosed area.

The foregoing objects are completed in the preferred embodiment of the invention by a method for manufacturing of a composite comprising a polymer and natural materials cast to a specific size and shape, such that the composites comprise dimensions of common home building lumber, which involves the steps of heating the polymer and natural materials to an elevated temperature. A liquid curing agent is heated to generally the same temperature. The elevated temperature to which the constituents are heated is below the curing temperature of the curing agent, but sufficiently high so that the viscosity of the polymer is reduced from that experienced at room temperature or at temperatures that approach the temperature in which the curing agent cures and becomes thicker. Blending of a prescribed weight of a curing agent is performed in a tub batch mixer for a predetermined time with at least one preheated natural material such as wood fillers.

One or two or more preheated natural material fillers of a larger size than the first filler are added to the mix and blended for a determined time. Thereafter, optionally one or two or more preheated larger natural material fillers are added to the mix and blended for a predetermined time. The blended material is then moved to an auger-type continuous mixer and/or to an extruder and extruded or cast to size in a mold.

Advantages of the composite lumber produced according to the invention include production of materials with no knots, no splits, no twisting, no bowing and no wood roll.

The composite lumber can be cast to any desired shape and size utilizing a mold.

In one embodiment, the composition comprises a natural binder or filler, a curable polymer material such as epoxy or polyurethane or the like, a flexibilizer, and a flame retardant.

Non-limiting examples of suitable lumber sizes include 2"×4", 2"×6", 2"×8", 2"×10", and 2"×12" boards of any length. Square pieces of lumber can also be produced such as 3"×3" pieces and 4"×4" pieces of any length.

In one aspect, a method for forming composite lumber including natural materials is disclosed, comprising the steps of obtaining one or more natural materials from a renewable plant-based and/or tree-based source; separating the natural materials into at least two different size groups; preheating a polymer to a temperature above 25° C.; preheating the natural materials to a temperature above 25° C.; blending a smallest size group of the preheated natural materials with the preheated polymer to create a first composite mixture; blending the first mixture with at least one larger size group of the preheated natural material to form a second composite mixture; blending a curative with the second composite mixture to form a curable composite mixture; and molding and curing the curable composite mixture to produce a piece of composite lumber.

In an additional aspect, the method further includes the step of pouring the curable composite mixture into a mold having a cavity sized to dimensions of the composite lumber to be produced.

In still a further aspect, the molding step is a casting process.

In a further aspect, the molding step includes adding the curable composite mixture to an extruder and extruding a cured form, wherein the cured form is processed to produce the composite lumber.

In an additional aspect, the natural materials comprise one or more of straw, ash, seeds, leaves, nut shells, grain hulls, pine needles, pine cones, plant fibers, grass, cork sawdust, wood chips, wood fibers, ground wood, wood flour, wood flakes, plant fibers and cork.

In still a further aspect, the polymer comprises one or more of polyurethane and epoxy.

In a further aspect, the method further includes the steps of i) blending an additional larger size group of the preheated natural materials to form a third composite mixture whereby the third composite mixture includes at least three different size groups of natural materials and ii) molding and curing composite mixture.

In an additional aspect, the steps of i) blending one or more additional larger size groups of preheated natural materials with the third composite mixture and ii) molding and curing the third composite mixture including additional material.

In a further aspect, at least three different types of natural materials are utilized to form the composite mixture.

In another aspect, the curable composite mixture includes from about 20 to about 90 parts by weight of curable polymer and 10 to 80 parts by weight of the natural materials based on the total weight of the curable polymer and renewable natural materials present in the composition that are utilized to form the composite lumber or other building materials.

In a further aspect, the curable composite mixture includes from about 30 to about 80 parts by weight of curable polymer and 20 to 70 parts by weight of the natural materials based on the total weight of the curable polymer and renewable natural materials present in the composition that are utilized to form the composite lumber or other building materials.

In an additional aspect, the curing takes place in a curing oven operated at a temperature suitable to activate the curative.

In still a further aspect, the processing steps take place in a temperature and humidity controlled enclosed area.

In another aspect, the natural materials comprise one or more of straw, ash, seeds, leaves, nut shells, grain hulls, pine needles, pine cones, plant fibers, grass, cork, sawdust, wood chips, wood fibers, ground wood, wood flour, and wood flakes, wherein the polymer comprises one or more of polyurethane and epoxy, and further including the step of blending an additional larger size group of the preheated natural materials to form a third composite mixture whereby the third composite mixture includes at least three different size groups of natural materials and molding and curing the composite mixture.

In a further aspect, the natural materials comprise one or more of straw, ash, seeds, leaves, nut shells, grain hulls, pine needles, pine cones, plant fibers, grass, cork, sawdust, wood chips, wood fibers, ground wood, wood flour, and wood flakes, wherein the polymer comprises one or more of polyurethane and epoxy, and further including the step of blending an additional larger size group of the preheated natural materials to form a third composite mixture whereby the third composite mixture includes at least three different size groups of natural materials and molding and curing the composite mixture.

In still a further aspect, a piece of composite lumber formed by the method.

In another aspect, a piece of composite lumber formed by the method.

In a further aspect, a piece of composite lumber formed by the method.

In still a further aspect, a method for forming a polymer-natural material composite article is disclosed, comprising the steps of obtaining one or more natural materials from a renewable plant-based and/or tree-based source; separating the natural materials into at least two different size groups; preheating a polymer to a temperature above 25° C.; preheating the natural materials to a temperature above 25° C.; blending a first size group of the preheated natural materials with the preheated polymer to create a first composite mixture; blending the first mixture with at least one second size group of the preheated natural material to form a second composite mixture; blending a curative with the second composite mixture to form a curable composite mixture; and molding and curing the curable composite mixture to produce the composite article.

In another aspect, the method further includes the step of pouring the curable composite mixture into a mold having a cavity sized to dimensions of the composite article to be produced, and wherein the natural materials comprise one or more of straw, ash, seeds, leaves, nut shells, grain hulls, pine needles, pine cones, plant fibers, grass, cork, sawdust, wood chips, wood fibers, ground wood, wood flour, and wood flakes, wherein the polymer comprises one or more of polyurethane and epoxy, and further including the step of blending an additional different size group of the preheated natural materials to form a third composite mixture whereby the third composite mixture includes at least three different size groups of natural materials and molding and curing the third composite mixture.

BRIEF DESCRIPTION OF THE DRAWINGS

The invention will be better understood, and other features and advantages will become apparent by reading the detailed description of the invention, taken together with the drawings, wherein.

DETAILED DESCRIPTION OF THE INVENTION

Figure 1:
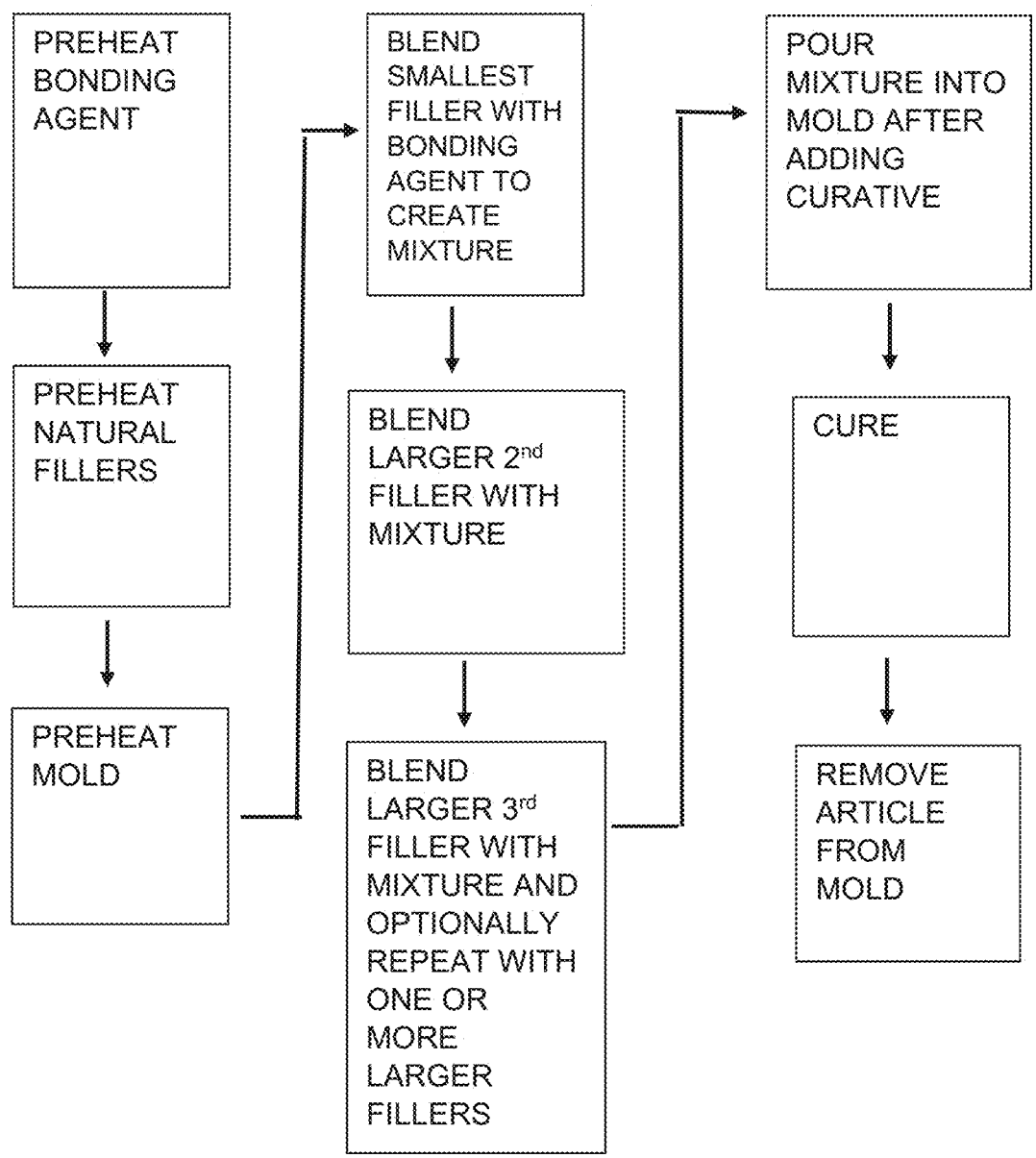
FIG. 1 is a schematic view of one embodiment of the process steps used in manufacturing an article of composite lumber in accordance with the method of the present invention.

The composite lumber and building materials of the present invention include a curable polymer and multiple renewable natural materials of different types and/or sizes. The composite lumber and building materials are produced by a method which includes the step of mixing at least two natural materials from one or more of a renewable plant-based or tree-based source of different sizes with a liquid or melted polymer at elevated temperature and forming the composite lumber through one or more of extrusion and casting.

Curable Polymer

The curable polymer is present in the composite lumber produced by the method of the invention in an amount sufficient to impart desired properties thereto. In preferred embodiments, the curable polymer is present in a sufficient amount such that it forms a matrix in which the renewable natural materials are dispersed. As utilized herein, the term "polymer" encompasses polymers and polymer precursors such as monomers that form polymers once cured.

In some embodiments, the curable polymer is present in an amount that ranges generally from about 20 to about 90 parts by weight, desirably from about 30 to about 80 parts by weight and preferably from about 40 to about 75 parts by weight based on the total weight of the curable polymer and renewable natural materials present in the composition that are utilized to form the composite lumber or other building materials.

The curable polymer includes one or more of epoxy and polyurethane. Any suitable curing agent or hardener can be utilized for the polymer. Suitable polymers and curing agents are available from companies such as Reichhold of Research Triangle Park, NC under the EPOTUF® product line and from PolyTek Development Corp. of Easton, PA under the CPD bio-based resin™ product line.

Various weight ratios of polymers and curing agents can be utilized as known to those of ordinary skill in the art in order to produce the desired composite lumber with natural materials therein.

Renewable Natural Materials

The renewable natural materials are obtained from a plant-based and/or tree-based source. The natural materials can be gathered in the wild, purposely farmed, or obtained as a byproduct from some other production process.

The renewable natural materials can be derived from tree-based source such as wood or any byproduct thereof, but not limited to, such as sawdust, wood chips, wood fibers, ground wood, wood flour, and wood flakes. Suitable other natural materials include plant-based sources, such as, but not limited to, straw, ash, seeds, grains, leaves, nut shells, grain hulls, pine needles, pine cones, plant fibers, grass and cork.

In an important aspect of the present invention, natural materials of at least two or three different sizes are utilized.

The natural materials are generally considered fillers as they do not form a matrix per se, like the polymer. However, it is important to recognize that the natural materials beneficially contribute to the desirable properties of the composite lumber produced according to the method of the invention. The natural materials can contribute to the strength, impact resistance and wear resistance, for example.

The natural materials can be present in the composition in any desired amounts. That said, natural material is present in an amount generally from about 10 to about 80 parts by weight, desirably from about 20 to about 70 parts by weight and preferably from about 25 to about 60 parts by weight based on the total weight of the curable polymer and renewable materials.

Manufacturing Methods

The methods for manufacturing the composite lumber include sequentially adding larger sizes of the fillers to a curable polymer and blending the same. Thereafter, the polymer is cured in a mold to produce a composite article of a predetermined size or formed in an extruder and thereafter machined or otherwise processed into a desirable length.

After fabrication, the articles of composite lumber produced using the method of the present invention can be further processed if desired. For example, the composite lumber and building materials can be sanded, machined, drilled or the like, or any combination thereof.

FIG. 1 shows a schematic view of one embodiment of the process steps used in manufacturing an article of composite lumber in accordance with the method of the present invention.

In a first step, the desired polymer is preheated, preferably in a suitable container. The container includes or is equipped with a mixing apparatus. Preheating temperatures include those temperatures below which the polymer cures. Preferably sufficiently high temperatures are utilized such that the viscosity of the polymer is reduced from that experienced at room temperature. Suitable preheating temperatures are at least 25° C., at least 30° C., at least 40° C., at least 50° C. or at least 70° C. Preheating temperatures depend upon the type of polymer and natural materials utilized.

One or more different types of natural materials are obtained from a renewable source. The natural materials are then separated into at least two different size groups and preferably three or more different size groups, for example 3, 4, 5 or 6 different size groups. Optionally, but preferably, each natural filler desired to be blended with the polymer is preheated individually.

The mold to be utilized to cast the article composite lumber is also preheated.

Once the desired natural material and polymer are preheated, the smallest size natural material is blended with the polymer and preferably mixed so that the natural material is dispersed within the polymer. The blending is preferably performed in a batch mixer generally comprising a vat or tub and a mixing device.

Thereafter, the material having the next size larger than first natural material is blended with the mixture containing the smallest filler. Again, the mixture is preferably blended until the natural materials are adequately dispersed.

In one or more subsequent steps, the next larger natural materials is/are added individually to the mixture and blended.

In a further step, the curing agent or hardener is added to the mixture which is then poured into the mold and subsequently cured. Alternatively, the mixture including all desired natural materials is molded in an extruder which contains a die at its exit orifice that shapes the composite polymer blend into a desired profile.

After the article of composite lumber is cured, it is removed from the mold and utilized. The composite lumber produced by the process of the present invention is high in strength, impact resistance, has desirable high-temperature and low-temperature stability. The composite lumber also has a low coefficient of thermal expansion and the advantages of good stain resistance, wear resistance and aging resistance. The methods of the present invention including sequential addition of larger size fillers ensures uniformity of the composite component produced by the method, thereby providing the indicated advantages.

Figure 2:
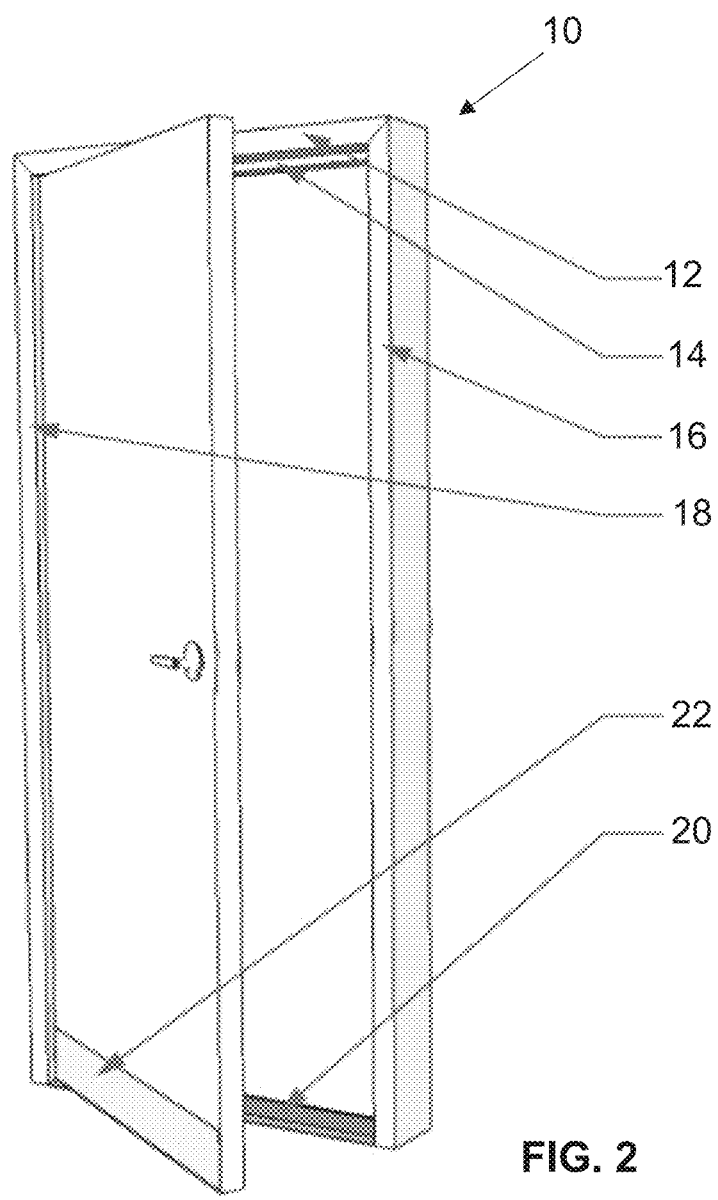
FIG. 2 is a schematic view of one embodiment illustrating components of composite lumber that can be formed utilizing the methods of the present invention.

FIG. 2 illustrates some components of composite lumber producible according to the methods of the invention. A door frame 10 is illustrated and includes a head or head jamb 12, a stop 14, a stop jamb 16, a hinge jamb 18, a threshhold 20 and a sill 22 such as a kickplate. Each of the components can be individually cast and thereafter assembled to provide the door frame. Alternatively, suitable profiles can be extruded and then further processed to produce the composite lumber pieces.

For the avoidance of doubt, the methods of the present invention encompass all possible combinations of the components, including various ranges of said components, disclosed herein. It is further noted that the term 'comprising' does not exclude the presence of other elements. However, it is also to be understood that a description of an article comprising certain components also discloses a product consisting of these components. Similarly, it is also to be understood that a description of a process comprising certain steps also discloses a process consisting of these steps.

In accordance with the patent statutes, the best mode and preferred embodiment have been set forth; the scope of the invention is not limited thereto, but rather by the scope of the attached claims.

What is claimed is:

1. A method of forming composite lumber or other building material including natural materials, comprising the steps of:
   obtaining one or more natural materials from a renewable plant-based and/or tree-based source;
   separating the one or more natural materials into at least two different size groups;
   preheating a polymer to a temperature above 25° C.;
   preheating the one or more natural materials to a temperature above 25° C.;
   blending a smallest size group of the preheated natural materials with the preheated polymer to create a first heated composite mixture;
   blending the first heated composite mixture with at least one larger size group of the preheated natural materials to form a second heated composite mixture;
   blending a curative with the second heated composite mixture to form a heated curable composite mixture; and
   molding and curing the heated curable composite mixture to produce a piece of composite lumber or other building material, and
   wherein the polymer comprises one or more of polyurethane and epoxy and the polymer is present in an amount that ranges from greater than 60 parts by weight based and less than 90 parts by weight.

2. The method according to claim 1, further including the step of pouring the heated curable composite mixture into a mold having a cavity sized to dimensions of the composite lumber or other building material to be produced.

3. The method according to claim 2, wherein the molding step is a casting process.

4. The method according to claim 1, wherein the molding step includes adding the heated curable composite mixture to an extruder and extruding a cured form, wherein the cured form is processed to produce the composite lumber or other building material.

5. The method according to claim 1, wherein the natural materials comprise one or more of straw, ash, seeds, leaves, nut shells, grain hulls, pine needles, pine cones, plant fibers, grass, cork, sawdust, wood chips, wood fibers, ground wood, wood flour, and wood flakes.

6. The method according to claim 1, wherein the polymer comprises one or more of polyurethane and epoxy.

7. The method according to claim 1, further including the steps of i) blending an additional larger size group of the preheated natural materials that is larger than the at least one larger size group of the second heated composite mixture with the second heated composite mixture to form a third heated composite mixture whereby the third heated composite mixture includes at least three different size groups of natural materials and ii) molding and curing the third heated composite mixture.

8. The method according to claim 7, further including the steps of i) blending one or more additional larger size groups of preheated natural materials that is larger than the additional larger size group of preheated natural materials in the third heated composite mixture with the third heated composite mixture to form a fourth heated composite mixture, and ii) molding and curing the fourth heated composite mixture including the one or more additional larger size group of preheated materials.

9. The method according to claim 7, wherein at least three different types of natural materials are utilized to form the third heated composite mixture.

10. The method according to claim 1, wherein the curing takes place in a curing oven operated at a temperature suitable to activate the curative.

11. The method according to claim 1, wherein the preheating, blending, molding and curing processing steps take place in a temperature and humidity controlled enclosed area.

12. The method according to claim 2, wherein the natural materials comprise one or more of straw, ash, seeds, leaves, nut shells, grain hulls, pine needles, pine cones, plant fibers, grass, cork, sawdust, wood chips, wood fibers, ground wood, wood flour, and wood flakes, wherein the polymer comprises one or more of polyurethane and epoxy, and further including the step of blending an additional larger size group of the preheated natural materials that is larger than the at least one larger size group of the second heated composite mixture with the second heated composite mixture to form a third heated composite mixture whereby the third heated composite mixture includes at least three different size groups of natural materials and molding and curing the third heated composite mixture.

13. The method according to claim 4, wherein the one or more natural materials comprise one or more of straw, ash, seeds, leaves, nut shells, grain hulls, pine needles, pine cones, plant fibers, grass, cork, sawdust, wood chips, wood fibers, ground wood, wood flour, and wood flakes, wherein the polymer comprises one or more of polyurethane and epoxy, and further including the step of blending an additional larger size group of the preheated natural materials that is larger than the at least one larger size group of the second heated composite mixture with the second heated composite mixture to form a third heated composite mixture whereby the third heated composite mixture includes at least three different size groups of natural materials and molding and curing the third heated composite mixture.

14. A method for forming a polymer-natural material composite article, comprising the steps of:
   obtaining one or more natural materials from a renewable plant-based and/or tree-based source;
   separating the one or more natural materials into at least two different size groups;
   preheating a polymer to a temperature above 25° C.;
   preheating the one or more natural materials to a temperature above 25° C.;
   blending a first size group of the preheated natural materials with the preheated polymer to create a first heated composite mixture;
   blending the first heated composite mixture with at least one second size group of the preheated natural materials to form a second heated composite mixture;

blending a curative with the second heated composite mixture to form a heated curable composite mixture; and molding and curing the heated curable composite mixture to produce the composite article, and wherein the polymer comprises one or more of polyurethane and epoxy and the polymer is present in an amount that ranges from greater than 60 parts by weight and less than 90 parts by weight.

15. The method according to claim 14, further including the step of pouring the curable composite mixture into a mold having a cavity sized to dimensions of the composite article to be produced, and wherein the natural materials comprise one or more of straw, ash, seeds, leaves, nut shells, grain hulls, pine needles, pine cones, plant fibers, grass, cork, sawdust, wood chips, wood fibers, ground wood, wood flour, and wood flakes, wherein the polymer comprises one or more of polyurethane and epoxy, and further including the step of blending an additional different size group of the preheated natural materials that is larger than the at least one larger size group of the second heated composite mixture with the second heated composite mixture to form a third heated composite mixture whereby the third heated composite mixture includes at least three different size groups of natural materials and molding and curing the third heated composite mixture.

* * * * *